United States Patent [19]

Yamamoto et al.

[11] 4,378,407

[45] Mar. 29, 1983

[54] MAGNET WIRE

[75] Inventors: Teruyuki Yamamoto; Masayoshi Miyake; Munetaka Kawaguchi; Hirohiko Nakabayashi, all of Nagoya, Japan

[73] Assignee: Sumitomo Electric Industries Ltd., Osaka, Japan

[21] Appl. No.: 221,748

[22] Filed: Dec. 31, 1980

[30] Foreign Application Priority Data

Jan. 24, 1980 [JP] Japan ................................. 55/7510

[51] Int. Cl.[3] .......................... B32B 15/00; H01B 7/00
[52] U.S. Cl. ................................ 428/383; 174/110 N; 174/120 SR; 428/379
[58] Field of Search .................. 428/379, 383, 375; 174/110 N, 110 SR, 120 SR; 260/18 N; 528/73, 351

[56] References Cited

U.S. PATENT DOCUMENTS

| | | | |
|---|---|---|---|
| 3,300,420 | 1/1967 | Frey | 521/157 |
| 3,361,593 | 1/1968 | Sattler et al. | 428/383 |
| 3,493,413 | 2/1970 | Olson et al. | 174/110 N X |
| 3,523,820 | 8/1970 | Sheffer | 174/110 N |
| 3,778,411 | 12/1973 | Emerick et al. | 428/379 X |
| 3,803,103 | 4/1974 | Magay | 428/379 |
| 3,922,465 | 11/1975 | Kawaguchi et al. | 428/383 |
| 4,072,641 | 2/1978 | Loeb | 260/18 N |

FOREIGN PATENT DOCUMENTS 1333939 10/1973 United Kingdom ............... 428/379

*Primary Examiner*—Lorraine T. Kendell
*Attorney, Agent, or Firm*—Sughrue, Mion, Zinn, Macpeak and Seas

[57] ABSTRACT

A magnet wire comprising a conductor having thereon an outermost insulating wire enamel layer, either directly or over another insulating layer, said wire enamel consisting essentially of a polyamideimide wherein either one or both ends of at least one polyamideimide molecule is a terminal linear alkyl group having at least 21 carbon atoms. The magnet wire has a high resistance to refrigerant as well as to thermal or mechanical damage and has a high lubricity.

16 Claims, 1 Drawing Figure

MAGNET WIRE

BACKGROUND OF THE INVENTION

This invention relates to a magnet wire having high lubricity.

A recent trend in the manufacture of electric devices using enameled wires is to achieve faster production by using a high-speed auto-winder. However, the insulation layer of an enameled wire tends to be mechanically damaged during winding due to friction, and after the wire is built into an electric device, layer-shorting may occur causing a great increase in the loss factor. To reduce such mechanical damage, an enameled wire having good lubricity has been desired. Good lubricity is also needed for manual insertion of an enameled wire into a small slot in a motor. Since the enameled wire itself has poor lubricity, the stated object has been achieved by coating the enameled wire with liquid lubricants such as liquid paraffin and refrigerating machine oil. On the other hand, the need for an enabeled wire having high mechanical strength and scrape resistance sufficient to avoid mechanical damage during winding has been partially met by using a nylon overcoated enameled wire or polyamideimide overcoated enameled wire.

Nowadays, there is a need for motors and transformers of even higher efficiency to achieve energy conservation, and the need is particularly great with motors, such as hermetic motors used in air conditioners and refrigerators. To meet this end, even more enameled wires are inserted into a small slot in a motor to achieve a higher space factor. Conventionally, most hermetic motors have used certain polyester imide or polyamideimide overcoated enameled wires that are high not only in mechanical strength and scrape resistance, but also in refrigerant resistance. In addition, to prevent deterioration due to winding or to realize efficient coil insertion into a slot, these enameled wires have been coated with refrigerating machine oil in most cases. However, when an attempt is made to increase the efficiency of a motor by inserting more enameled wires into a small slot so as to achieve a higher space factor, many problems arise that can hardly be solved by the conventional enameled wires coated with refrigerating machine oil or other known lubricants.

First, liquid lubricants such as refrigerating machine oil do not have an adequate lubricating property and slipperiness, so a desired large number of enameled wires cannot be accommodated in the slot, and should they be forcibly inserted by applying greater force, the coating of insulation can be mechanically damaged, thus increasing the possibility of layer-shorting. Second, due to poor lubricity, enameled wire in the motor will be subjected to electromagnetic vibrations that can also cause mechanical damage to the insulation coating, whereupon layer-shorting may occur and the motor will fail to perform its function.

An attempt to provide improved lubricity by applying a great volume of liquid lubricant has little effectiveness, and worse than that, it increases the tendency of dust to be deposited on the enameled wire. Furthermore, excessive oil can adversely affect the bonding power of an adhesive tape used for sealing the coil ends. Coating the enameled wire with solid paraffin, carnauba wax and other solid lubricants that have better lubricating property and slipperiness than liquid lubricants has been tried, but when the enameled wire coated with such solid lubricants is applied to a hermetic motor, a lubricant extracted with the refrigerant can clog the opening of the compressor valve or the refrigerant expansion valve in the refrigerator, thereby reducing the refrigerating capacity of the machine. The extracted lubricant also reduces the lubricity and slipperiness of the enameled wire and makes the insulating coating more vulnerable to damages caused by electromagnetic vibrations. The solid lubricants are usually applied to the enameled wire as a solution wherein a few percent of the lubricant is dissolved in solvents such as petroleum benzine and xylene. However, the use of large amounts of low-boiling solvents is not only hazardous and toxic, but also causes crazing in some types of electric wires, thus destroying their commercial value. Therefore, solid lubricants can only be applied to limited types of wire.

Another method proposed for providing an enameled wire with good lubricating properties is to coat a conductor with an insulating wire enamel that contains synthetic resins having high lubricating property such as polyethylene, polypropylene and ethylene tetrafluoride resin, as well as liquid or solid lubricants such as silicone oil, fluorine-containing surfactants, paraffin wax, carnauba wax and montan wax. But since synthetic resins such as polyethylene, polypropylene and ethylene tetrafluoride resin are only sparingly soluble in solvents typically used for the insulating wire enamel, it is not easy to disperse them in the wire enamel uniformly, and the resulting wire enamel has low stability. What is more, these resins are not miscible with the enamel insulating material; hence, it is not easy to provide an insulating coating having good appearance in which the resins are uniformly dispersed.

Liquid lubricants mixed with the insulating wire enamel do not provide any better slipperiness and lubricating property than when they are directly applied to the enameled wire.

Solid lubricants in the insulating wire enamel may be extracted with the refrigerant or solvent, as in the case when they are directly applied to the enameled wire, and so a method of using an insulating wire enamel that contains solid lubricants is not easy to apply to the manufacture of an enameled wire for hermetic motors. In addition, like the synthetic resins, solid lubricants are sparingly soluble in solvents for the insulating wire enamel, and are not miscible with the enamel insulating material. Thus, the resulting wire enamel is not stable, and it is difficult to provide an insulating coating of good appearance in which the solid lubricants are uniformly dispersed.

SUMMARY OF THE INVENTION

This invention provides a magnet wire comprising a conductor having thereon an outermost insulating wire enamel layer, either directly or over another insulating layer, said wire enamel consisting essentially of a polyamideimide wherein either one or both ends of at least one polyamideimide molecule is a terminal linear alkyl group having at least 21 carbon atoms. It may also be present in other layers, if desired.

The magnet wire of this invention has lubricity equal to that of a magnet wire produced by coating an enameled wire with a solid lubricant such as solid paraffin or carnauba wax, or by coating a conductor with an insulating wire enamel that contains such solid lubricant or a synthetic resin having a good lubricating property, such as polyethylene or polypropylene. The magnet wire of this invention is characterized by an insulation coating composed of a material having a good lubricating property, and unlike conventional magnet wire, no lubricant is present on the surface of the wire or within the insulation coating. As a further advantage, the material of the insulation coating is not a mere blend of an insulating wire enamel and a lubricant, so the coating is strong enough to withstand friction or other mechanical damage that accompany the operation of inserting the magnet wire into a slot. Accordingly, the magnet wire of this invention has better appearance than that obtained by coating conductor with an insulating wire enamel that contains a synthetic resin having high lubricating property such as polyethylene or polypropylene. As compared with a magnet wire produced by coating an enameled wire with a solid lubricant such as solid paraffin or carnauba wax or by coating a conductor with an insulating wire enamel containing such solid lubricant, less of the coating of the magnet wire of this invention is extracted with the refrigerant or solvent and hence is less likely to clog the opening of the compressor valve or the refrigerant expansion valve. For this reason, the magnet wire of this invention can be used in a hermetic motor that requires high resistance to refrigerant.

BRIEF DESCRIPTION OF THE DRAWING

The FIGURE shows a graph indicating infrared absorption spectrum of a polymer film obtained by baking a conventional wire enamel.

DETAILED DESCRIPTION OF THE IVENTION

Figure 1:
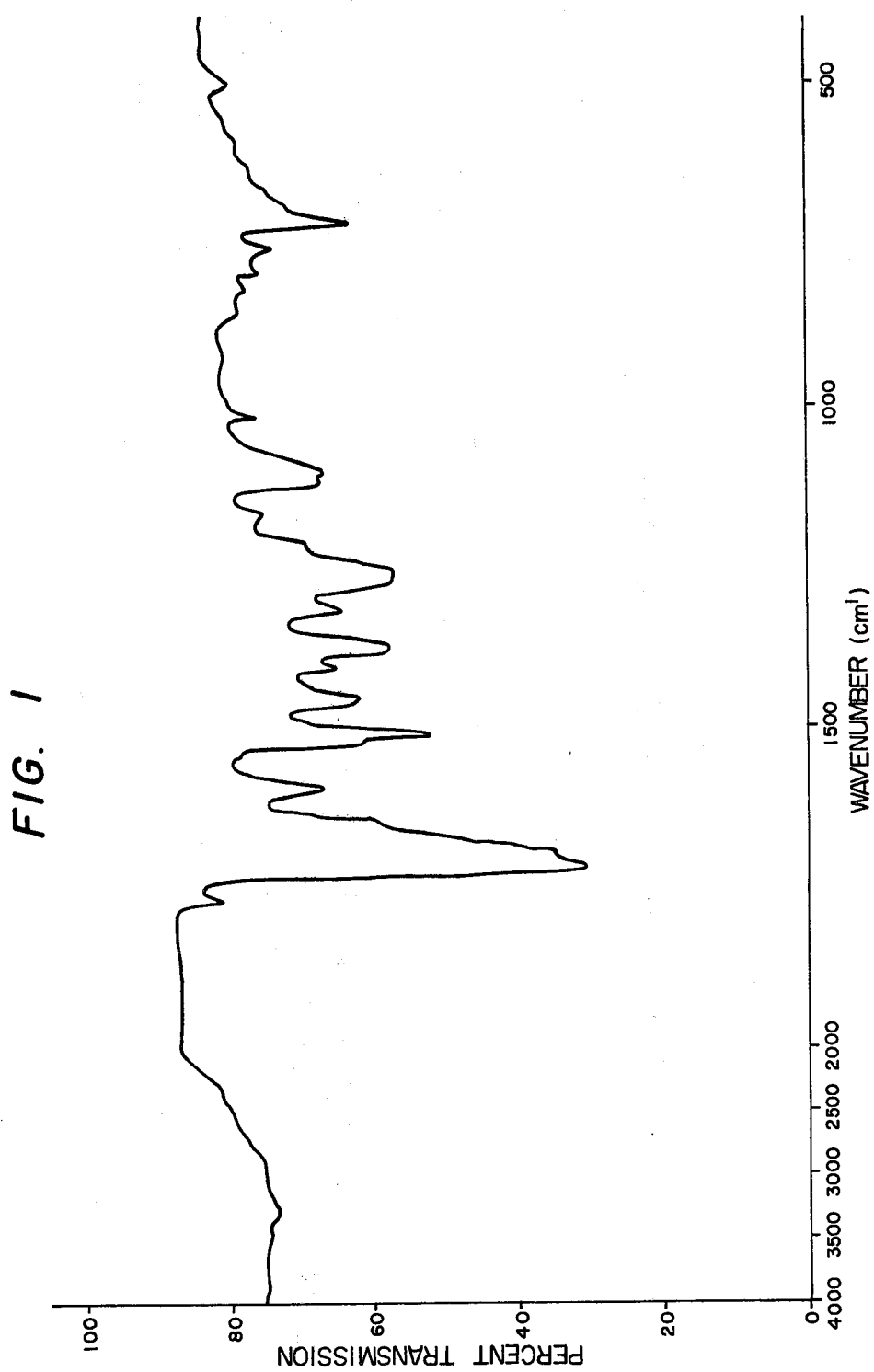

According to this invention, wire enamel that consists essentially of a polyamideimide wherein one or both ends of at least one molecule thereof is a linear alkyl group having at least 21 carbon atoms is applied to a conductor to form at least the outermost coating of magnet wire, and is baked. Unless the wire enamel is applied to form at least the outermost coating, a magnet wire having high lubricity is not obtained. The wire enamel of this invention is applied to a conductor either directly or over another insulating layer, and is baked. Even a very thin layer of the resin has very high lubricity and great resistance to thermal or mechanical damage, so it is used with particular advantage as a protective coating on other insulation, which may be made of any known insulating material, for example, polyimide, polyester, polyester imide, polyhydantion, polyamideimide, polyester amideimide, polyhydantion ester and polyester amide. These insulating materials are described, for example, in British Pat. No. 903,271, U.S. Pat. Nos. 4,014,832, 2,936,296, 3,426,098, 3,697,471, 3,541,038 and 3,829,399, Japanese Patent Publication Nos. 28288/64 and 18876/69. Since the magnet wire of this invention is used with particular advantage in hermetic motors, polyester imide and polyester amideimide which are conventional as an insulation for refrigerant-resistant magnet wire are desirably used.

The term "polyamideimide wherein one or both ends of at least one molecule is a linear alkyl group having at least 21 carbon atoms" as used herein refers to a mixture of polyamideimides of the formulae (I), (II) and (III)

 (I)

 (II)

$\pm$PAI$\pm$ (III)

wherein (PAI) is a polyamideimide constituting the main chain; R is a linear alkyl group having at least 21 carbon atoms, which is characterized by $n_1 + n_2 \geq 1$ when the numbers of the molecules of the formulae (I), (II) and (III) are $n_1$, $n_2$, and $n_3$, respectively.

According to this invention, the polyamideimide preferably contains from 0.3 to 3.2 wt% of terminal linear alkyl groups. If the content of the terminal linear alkyl group in the polyamideimide is less than 0.3 wt%, not enough lubricity is obtained, and if the content is greater than 3.2 wt%, the resulting wire enamel does not have high storage stability, and has an adverse effect on the appearance and mechanical properties of the magnet wire. For providing a wire enamel having high storage stability and which is capable of providing a magnet wire of good appearance, it is particularly preferred that the content of the linear alkyl group in the polyamideimide be in the range of from 0.3 to 2.3 wt%. More specifically, assuming that the numbers of the molecules of the formulae (I), (II) and (III) are $n_1$, $n_2$, and $n_3$, respectively, the value of K represented by the following formula is preferably $0.3 \leq K \leq 3.2$, and more preferably $0.3 \leq K \leq 2.3$.

$$K = \frac{n_1 \times (R) + n_1 \times (R) + n_2 \times (R)}{n_1 \times (R + PAI + R) + n_2 \times (R + PAI +) + n_3 \times (+ PAI +)} \times 100$$

wherein the parentheses represent the formula weights of the parenthesized groups, or the molecular weights of the parenthesized molecules.

The polyamideimide that constitutes the main chain may be linked to a terminal linear alkyl group through an amide bond, imide bond, ester bond, urethane bond, urea bond or any other bond. For providing greater heat resistance, the polyamideimide in the main chain is desirably linked to a terminal alkyl group through an amide bond or imide bond. For achieving good lubricity, the linear alkyl group at an end of the molecule of the polyamideimide resin must have at least 21 carbon atoms, and if the number of carbon atoms is less than 21, adequate lubricity is not obtained. More specifically, when the terminal alkyl group is represented by the formula $(CH_2)_{n-1}CH_3$, n is 21 or more. The alkyl chain is desirably a straight linear chain, but a slightly branched alkyl is also effective if its linear portion has at least 21 carbon atoms.

The polyamideimide that constitutes the main chain in the wire enamel of this invention can be prepared from various known materials, for example, tribasic acid anhydride monohalide and polyamine (e.g., U.S. Pat. Nos. 3,260,691 and 3,347,828), tetrabasic dihydrate having an amido group and polyamine (e.g., U.S. Pat. Nos. 3,355,427 and 3,453,292), tribasic acid anhydride and polyisocyanate (e.g., U.S. Pat. Nos. 3,300,420, 3,314,923 and 3,541,038), as well as from tribasic acid anhydride, cyclic lactam and polyisocyanate, from tribasic acid anhydride, aminocarboxylic acid and polyisocyanate, from tribasic acid anhydride monohalide, polyamine and polyisocyanate, from dibasic acid halide, tetrabasic acid anhydride and polyamine, from tribasic acid anhydride, polyisocyanate and alkylene carbonate, and from tribasic acid anhydride, polyisocyanate and polyol. These materials may be used in other combinations, or part or all of the tribasic acid anhydride may be replaced by other polybasic acids or their derivatives.

The polyamideimide that constitutes the main chain in the wire enamel of this invention may be prepared by using any of the combinations of materials described above. Useful individual materials for preparing the polyamideimide in the main chain are described below.

Illustrative polyisocyanates include aromatic, aliphatic and alicyclic polyisocyanates, such as diphenylmethane-4,4'-diisocyanate, diphenylether-4,4'-diisocyanate, 2,4-tolylene diisocyanate, 2,6-tolylene diisocyanate, m-xylylene diisocyanate, p-xylylene diisocyanate, isophorone diisocyanate, ethylene diisocyanate, hexamethylene diisocyanate, tolylene diisocyanate trimer, isophorone isocyanate trimer, and polyphenyl-polymethylene-polyisocyanate, as well as "stabilized polyisocyanates" wherein the isocyanate group in the polyisocyanates named above is stabilized with compounds having a phenolic hydroxyl group or alcoholic hydroxyl group, or by cyclic lactams. These polyisocyanates can be used independently or as a mixture.

Illustrative polybasic acids include aromatic, aliphatic and alicyclic polycarboxylic acids and their derivatives, such as trimellitic acid, trimellitic acid anhydride, pyromellitic acid, pyromellitic dianhydride, benzophenonetetracarboxylic dianhydride, 1,2,3,4-butanetetracarboxylic acid, isophthalic acid, terephthalic acid, adipic acid and sebacic acid, as well as diamidodicarboxylic dianhydride prepared from 2 mols of tribasic acid monohalide and 1 mol of diamine, diimidodicarboxylic acid prepared from 2 mols of tribasic acid and 1 mol of diamine, imidodicarboxylic acid prepared from 1 mol of tribasic acid anhydride and 1 mol of amino acid, and dilactam dicarboxylic acid prepared from 2 mols of 5- or 6-membered ring forming unsaturated dibasic acid and 1 mol of diamine. In addition to these polybasic acids and anhydrides thereof, acid halides such as trimellitic acid monochloride, isophthalic acid dichloride and terephthalic acid dichloride, and esters such as monomethyl trimellitate, dimethyl terephthalate and dimethyl isophthalate.

Illustrative polyamines include aromatic, aliphatic and alicyclic polyamines such as 4,4'-diaminodiphenylmethane, 4,4'-diaminodiphenyl ether, m-phenylenediamine, p-phenylenediamine, ethylenediamine, hexamethylenediamine, m-xylylenediamine and p-xylylenediamine.

Illustrative amino acids include glycine, $\beta$-alanine, $\epsilon$-aminocaproic acid, and p-aminobenzoic acid.

Illustrative unsaturated dibasic acids that react with diamine to form a 5- or 6-membered ring are itaconic acid and aconitic acid.

Illustrative cyclic lactams are $\epsilon$-caprolactam, $\delta$-valerolactam and $\omega$-laurolactam.

Illustrative alkylene carbonates are ethylene carbonate and propylene carbonate.

Examples of the compound used for introducing a linear alkyl group having at least 21 carbon atoms at an end of the polyamideimide constituting the main chain in the wire enamel of this invention are aliphatic acids, their alkyl esters and acid halides, as well as alcohols, amines and aliphatic amides.

Illustrative aliphatic acids include docosanoic acid, tricosanoic acid, tetracosanoic acid, pentacosanoic acid, hexacosanoic acid, heptacosanoic acid, octacosanoic acid, nonacosanoic acid, and triacontanoic acid, and derivatives such as esters, acid anhydrides and acid halides thereof.

Illustrative alcohols include n-heneicosanol, n-docosanol, n-tetracosanol, n-hexacosanol, n-octacosanol, and n-triacontanol.

Illustrative amines include heneicosylamine, docosylamine, tricosylamine, pentacosylamine, hexacosylamine and octacosylamine.

Illustrative aliphatic acid amides include docosylamide, hexacosylamide, and octacosylamide.

It is to be understood that for introducing a linear alkyl group at an end of the molecule of polyamideimide, these compounds must have a functional group capable of reacting with the materials specified above for use in the production of the polyamideimide in the main chain. These compounds may be used either independently or as a mixture. For example, Hoechst Wax S (available from Hoechst Japan Ltd.), which is based on montan wax acid (chain length: $C_{28}$ to $C_{32}$), Hoechst Wax E, and Hoechst Wax OP which are also derivatives of montan wax acid (the former being an ester, and the latter a partial saponified ester) can be used.

The polyamideimide used in this invention in which one or both ends of at least one molecule thereof is a linear alkyl group having at least 21 carbon atoms is prepared by reacting the materials for making the main chain polyamideimide with the compounds for introducing a linear alkyl group at an end of the molecule. For achieving high reactivity, easy control of reaction and easy elimination of reaction by-products, it is preferred that a polybasic acid which contains at least a tribasic acid anhydride typified by trimellitic acid anhydride and a polyisocyanate typified by diphenylmethane-4,4'-diisocyanate be used as the materials for making the polyamideimide main chain, and that a linear carboxylic acid having at least 22 carbon atoms be used as the compound for introducing a linear alkyl group at an end of the molecule of the polyamideimide. The sum of the equivalent amount of the polybasic acid component containing at least a tribasic acid anhydride and that of the linear carboxylic acid used to introduce a linear alkyl group is desirably in the range of from 0.95 to 1.05 equivalents per equivalent of the polyisocyanate compound. The reaction for producing the polyamideimide wherein one or both ends of at least one molecule is a linear alkyl group having at least 21 carbon atoms is carried out in either the presence or absence of a solvent, but the presence of a solvent is preferred to facilitate control of the reaction. Solvents consisting mainly of N-methyl-2-pyrrolidone, N,N-dimethylacetamide, m-cresol, p-cresol and various kinds of xylenol are preferred because the polymer solution obtained can be used as an enamel insulating wire enamel directly. Solvents that control the viscosity of the polymer solution may be selected from among toluene, xylene, solvent naphtha, acetone, methyl ethyl ketone, cyclohexanone and cellosolve acetate.

The wire enamel used in this invention that consists essentially of a polyamideimide wherein one or both ends of at least one molecule thereof is a linear alkyl group having at least 21 carbon atoms is a polymer solution of the polyamideimide. The wire enamel may also contain at least one compound selected from among another thermoplastic resin, thermosetting resin, filler, pigment, and dye in amounts which do not affect the properties of the polymer solution adversely.

This invention is now described in greater detail by reference to the following preparative examples, reference examples and examples showing use which are given here for illustrative purposes only and are not intended to limit the scope of the invention.

In the following reference examples, preparative examples and examples, all reactions were conducted in a reaction vessel, with stirring, equipped with a condenser, said vessel comprising a 2-liter four-necked flask equipped with a calcium chloride cylinder, a thermometer, a nitrogen supply pipe, and a stirrer, respectively. The reaction vessel was heated with a mantle heater. Part of the resulting polymer solution was put into a large volume of ethanol to separate the end polymer. After drying, the reduced viscosity of the polymer was measured at 30° C. in N,N-dimethylacetamide at a concentration of 0.5 g of resin per 100 ml of the solvent.

In the following reference examples, preparative examples and examples, baking of polymer solution coated wires was carried out in a vertical furnace of 9.5 m in length at a supply speed of 15 m/min at a furnace temperature of 380° C. in the upper portion, 330° C. in the middle and 260° C. in the lower portion.

The characteristics of all magnet wires produced were measured in accordance with JIS C3003 or NEMA MW-1000 except for the coefficient of static friction. That is, percent R-22 extraction and heat shock were determined according to NEMA MW-1000 and adherence of insulating film to conductor at the broken points after sudden jerk to the breaking point, percent methanol extraction, percent xylol extraction and scrape resistance were tested according to JIS C-3003. With respect to the percent methanol extraction and percent xylol extraction the weight of the extract was measured using a residue method. The coefficient of static friction (between two magnet wires) was determined as follows: a metal block, to the bottom of which two parallel magnet wires were attached, was placed on two parallel magnet wires on a plane so that one pair of magnet wires formed a right angle with another pair, and the minimum load required for moving the metal block along the two magnet wires on the plane was divided by the weight of the block.

In the heat shock test the term "1d O.K.", "2d O.K.", "3d O.K.", or "4d O.K." indicates that the characteristics of the magnet wire tested are acceptable when they are tested after having been wound around a mandrel having a diameter which is the same as the diameter of the wire conductor of which is 2, 3 or 4 times as large as that of the wire conductor.

PREPARATIVE EXAMPLE 1

A mixture of 191.4 g of trimellitic acid anhydride, 3.5 g of octacosanoic acid and 833.5 g of N-methyl-2-pyrrolidone was charged into a reaction vessel, and under stirring, 250.3 g of diphenylmethane-4,4'-diisocyanate was gradually added to the mixture. After 3 hours of reaction at 80° C., the mixture was further heated at a rate of 20° C./hr. The viscosity of the solution increased gradually as carbon dioxide was generated. When a temperature of 170° C. was reached, the heating was stopped and the reaction was continued at that temperature for another 1.5 hours, until a solution of polyamideimide polymer wherein a linear alkyl group having 27 carbon atoms was linked to at least one end of the molecules thereof through an amide bond was formed. The polymer had a reduced viscosity of 0.56 dl/g. The content of the terminal alkyl group in the polymer was calculated by the following equation:

$$\frac{\left(\frac{379.7}{424.8}\right) \times 3.5}{250.3 + 191.4 + 3.5 - 88.0} \times 100 = 0.88 \text{ (wt \%)}$$

wherein 88.0 is the weight of by-product carbon dioxide; 424.8 is the molecular weight of octacosanoic acid; 379.7 is the weight of alkyl group in one mol of octacosanoic acid.

The polyamideimide solution was applied to an aluminum foil and baked first at 180° C. for one hour and then at 250° C. for one hour. The aluminum foil was removed with dilute hydrochloric acid to provide a polyamideimide film of 0.1 mm thick. The film was transparent and very tough. The polymer solution remained uniformly transparent even after a 3 months of storage at room temperature.

PREPARATIVE EXAMPLE 2

A solution of polyamideimide polymer wherein a linear alkyl group having 27 carbon atoms was linked to one or both ends of at least one molecule through an amide bond was formed by repeating the procedure of Preparative Example 1 except that the amounts of trimellitic acid anhydride and octacosanoic acid were changed to 190.6 g and 7.1 g, respectively. The polymer had a reduced viscosity of 0.49 dl/g. The content of linear alkyl in the polyamideimide polymer was 1.8 wt% as determined by the formula indicated in Preparative Example 1. The polymer solution remained uniformly transparent after 3 months of storage at room temperature. A polymer film prepared in the manner of Preparative Example 1 was tough and transparent.

REFERENCE EXAMPLE 1

A mixture of 192.1 g of trimellitic acid anhydride and 826.9 g of N-methyl-2-pyrrolidone was charged in a reaction vessel, and under stirring, 250.3 g of diphenylmethane-4,4'-diisocyanate was gradually added to the mixture. After 3-hour reaction at 80° C., the mixture was further heated at a rate of 20° C./hr. The viscosity of the solution increased gradually as carbon dioxide was generated. When a temperature of 170° C. was reached, the heating was stopped and the reaction was continued at that temperature for another 2 hours until a solution of polyamideimide polymer was formed. The polymer had a reduced viscosity of 0.61 dl/g.

REFERENCE EXAMPLE 2

The polyamideimide polymer solution prepared in Reference Example 1 was mixed with octacosanoic acid in an amount of 1.0 part per 100 parts of the polyamideimide resin. The wire enamel thus-formed was applied to an aluminum foil and baked first at 180° C. for one hour, and then at 250° C. for one hour. When the aluminum foil was removed with dilute hydrochloric acid, an opaque film 0.1 mm thick resulted. When the wire enamel was stored for one day at room temperature, it lost transparency, and upon storage of another one month, the insoluble matter precipitated to make the wire enamel opaque throughout.

REFERENCE EXAMPLE 3

The polyamideimide polymer solution prepared in Reference Example 1 was mixed with octacosanoic acid in an amount of 2.0 parts per 100 parts of the polyamideimide resin. The wire enamel thus-formed was applied to an aluminum foil and baked first at 180° C. for one hour, then at 250° C. for one hour. When the aluminum foil was removed with dilute hydrochloric acid, an opaque film of 0.1 mm thick resulted. The wire enamel was not transparent at the time of its preparation and became opaque throughout upon one-week storage.

EXAMPLES 1 AND 2

The polyamideimide wire enamels as prepared in Preparative Examples 1 and 2 were applied in seven layers to a copper wire (diameter: 1.0 mm) and baked. The characteristics of the magnet wires produced are shown in Table 1 below.

COMPARATIVE EXAMPLES 1, 2, AND 3

The polyamideimide wire enamels prepared in Reference Examples 1 to 3 were applied in seven layers to a copper wire (diameter: 1.0 mm) and baked. The characteristics of the magnet wires produced are also shown in Table 1 below.

reaction system was elevated to 130° C. in 2.5 hours, and after performing the reaction for 1 hour at that temperature, 12.7 g of octacosanoic acid was added. Thereafter, the reaction system was elevated to 170° C. over 2 hours (20° C./hr.), and the reaction was continued for another 2 hours at that temperature for completion. The viscosity of the solution increased gradually as carbon dioxide was generated. A polyamideimide polymer according to the invention with a linear alkyl group having 27 carbon atoms was produced, and the polymer had a reduced viscosity of 0.49 dl/g. The content of linear alkyl group in the polyamideimide polymer was 3.1 wt%.

PREPARATIVE EXAMPLE 4

A polyamideimide polymer solution was prepared in the same manner as in Preparative Example 1 except that the amounts of trimellitic acid anhydride and octacosanoic acid were 191.7 g and 1.8 g, respectively. The polymer had a reduced viscosity of 0.50 dl/g. The

TABLE 1

| Property/Test | Example 1 | Example 2 | Comp. Ex. 1 | Comp. Ex. 2 | Comp. Ex. 3 |
|---|---|---|---|---|---|
| | \multicolumn{5}{c}{Wire Enamel Used} | | | | |
| | Prep. Ex. 1 | Prep. Ex. 2 | Ref. Ex. 1 | Ref. Ex. 2 | Ref. Ex. 3 |
| Overall diameter (mm) | 1.049 | 1.050 | 1.050 | 1.048 | 1.048 |
| Bare diameter (mm) | 1.000 | 1.000 | 1.000 | 1.000 | 1.000 |
| Film thickness (mm) | 0.0245 | 0.025 | 0.025 | 0.024 | 0.024 |
| Appearance | good | good | good | fair | bad |
| Adherence of insulating film to conductor at the broken points after sudden jerk to the breaking point | | | | | |
| Number of cracks in film | 0, 0, 0 | 0, 0, 0 | 0, 0, 0 | 0, 0, 0 | 0, 0, 0 |
| Length of film removed from conductor (mm) | 1.4, 1.4, 1.3 | 1.3, 1.3, 1.9 | 1.3, 1.3, 1.4 | 7.4, 3.5, 3.3 | 31.5, 60.5, 83.1 |
| Length of conductor exposed (mm) | 0, 0, 0 | 0, 0, 0 | 0, 0, 0 | 0.7, 0.3, 0.9 | 4.3, 5.7, 7.7 |
| Percent methanol extraction (%) (extracted 4 hr.) | 0.10 | 0.12 | 0.03 | 0.14 | 0.15 |
| Percent xylol extraction (%) (extracted 4 hr.) | 0.07 | 0.08 | 0.04 | 0.11 | 0.13 |
| Percent R-22 extraction (%) (extracted 6 hr.) | 0.003 | 0.009 | 0.005 | 0.030 | 0.030 |
| Heat shock (20% snap, 280° C./30 min.) | 2d O.K. | 3d O.K. | 2d O.K. | 3d O.K. | 4d O.K. |
| Scrape resistance | | | | | |
| Repeated scrape under 440 g load (No. of repetitions) | 164 | 98 | 177 | 40 | 16 |
| Unidirectional scrape (g) | 1,136 | 1,057 | 1,201 | 396 | 393 |
| Coefficient of static friction | 0.09 | 0.05 | 0.34 | 0.13 | 0.12 |

As is clear from Table 1, the magnet wires of this invention (Examples 1 and 2) produced by coating a conductor with the wire enamels of Preparative Examples 1 and 2, and then baking the coating, had much better lubricity than a magnet wire (Comparative Example (1) prepared from the conventional polyamideimide wire enamel of Reference Example 1. As compared with the magnet wires (Comparative Examples 2 and 3) prepared from the wire enamels comprising a mixture of conventional polyamideimide wire enamel and a lubricant (Reference Examples 2 and 3), the magnet wires of this invention not only had higher lubricity and wear resistance, but also had less of the coating extracted with solvents, and proved very flexible.

Preparative Example 3

To a mixture of 189.2 g of trimellitic acid anhydride and 849.8 g of N-methyl-2-pyrrolidone, 250.3 g of diphenylmethane-4,4'-diisocyanate was gradually added, and reaction was conducted at 80° C. for 3 hours. The content of linear alkyl ($C_{27}$) group in the polymer was 0.45 wt%.

PREPARATIVE EXAMPLE 5

A solution of polyamideimide polymer with a linear alkyl group having 27 carbon atoms was prepared by the method of Preparative Example 1, except that the amounts of trimellitic acid anhydride and octacosanoic acid were 191.8 g and 1.3 g, respectively. The polymer had a reduced viscosity of 0.57 dl/g. The content of linear alkyl group in the polyamideimide was 0.32 wt%.

PREPARATIVE EXAMPLE 6

To a mixture of 189.2 g of trimellitic acid anhydride, 10.2 g of docosanoic acid and 844.0 g of N-methyl-2-pyrrolidone, 250.3 g of diphenylmethane-4,4'-diisocyanate was gradually added, and a reaction was conducted at 80° C. for 3 hours. The reaction system was elevated at 20° C./hr. to 170° C. over 4.5 hours, and the reaction was continued at that temperature for another 1.5 hours until a solution of polyamideimide polymer according to the invention with an alkyl group having 21 carbon atoms linked through an amide bond was obtained. The polymer had a reduced viscosity of 0.54 dl/g. The content of the terminal alkyl group in the polymer was calculated by the formula $$\frac{\left(\frac{295.6}{340.6}\right) \times 10.2}{189.2 + 10.2 + 250.3 - 88.0} \times 100 = 2.4 \text{ (wt \%)}$$

wherein 88.0 is the weight of by-product carbon dioxide; 340.6 is the molecular weight of docosanoic acid; 295.6 is the weight of alkyl group in one mol of docosanoic acid.

PREPARATIVE EXAMPLE 7

A solution of polyamideimide polymer was produced by the method of Preparative Example 6, except that the amounts of trimellitic acid anhydride and docosanoic acid were 191.2 g and 3.4 g, respectively. The content of terminal alkyl group in the polyamideimide polymer was 0.83 wt%. The reduced viscosity of the polymer was 0.52 dl/g.

PREPARATIVE EXAMPLE 8

A mixture of 191.4 g of trimellitic acid anhydride, 3.6 g of Hoechst Wax S and 834.0 g of N-methyl-2-pyrrolidone was charged into a reaction vessel, and under stirring, 250.4 g of diphenylmethane-4,4'-diisocyanate was added to the mixture gradually, followed by 3-hour reaction at 80° C. When the reaction system was elevated at a rate of 20° C./hr., the viscosity of the solution increased gradually as carbon dioxide was generated. When a temperature of 170° C. was reached, the heating was stopped, and the reaction was continued at that temperature for one hour until completion. A polyamideimide polymer having a reduced viscosity of 0.56 dl/g was obtained. The linear alkyl groups attached to the ends of the polyamideimide molecule had from 27 to 31 carbon atoms, and the content of linear alkyl groups in the polyamideimide was from 0.90 to 0.91 wt%.

The solutions of polyamideimide prepared in Preparative Examples 3 through 8 were applied to an aluminum foil, and baked, first at 180° C. for one hour, then at 250° C. for one hour. When the aluminum foil was removed with dilute hydrochloric acid, transparent and tough polyamideimide films 0.1 mm thick were obtained.

EXAMPLES 3 TO 12

A copper wire (diameter: 1.0 mm) was coated with six layers (seven layers in Ex. 11 and Ex. 12) of Isomid, a polyester imide wire enamel produced by Nisshoku Snectady Chemical Co., Ltd., and baked. Subsequently, the polyamideimide wire enamels indicated in Table 2 wherein one or both ends of at least one molecule was a linear alkyl group having at least 21 carbon atoms were applied in two layers (one layer in Ex. 11 and Ex. 12) and baked to prepare polyester imide magnet wires having a polyamideimide overcoat. The characteristics of the magnet wires produced are shown in Table 2.

The polyamideimide wire enamel of Preparative Example 3 gelled during a 3-month storage at room temperature, but the polyamideimide wire enamels of Preparative Examples 1, 2, and 4 to 8 remained viscous and uniformly transparent even after the 3-month storage.

PREPARATIVE EXAMPLE 9

To a mixture of 190.8 g of trimellitic acid anhydride and 831.5 g of N-methyl-2-pyrrolidone, 250.3 g of diphenylmethane-4,4'-diisocyanate was added, and reaction was conducted at 80° C. for 3 hours. The reaction system was elevated to 130° C. in 2.5 hours, and after conducting the reaction for 1 hour at that temperature, 4.0 g of octadecanoic acid was added. Thereafter, the reaction system was elevated to 170° C. in 2 hours, and the reaction was continued for another 1.5 hours at that temperature until completion. During the reaction, the viscosity of the solution increased gradually as carbon dioxide gas was generated. A polyamideimide polymer wherein one or both ends of at least one molecule thereof was a linear alkyl group having 17 carbon atoms was formed, and the reduced viscosity of the polymer was 0.51 dl/g. The content of linear alkyl group in the polymer was 0.95 wt%.

PREPARATIVE EXAMPLE 10

To a mixture of 187.3 g of trimellitic acid anhydride, 848.9 g of N-methyl-2-pyrrolidone and 14.2 g of octadecanoic acid, 250.3 g of diphenylmethane-4,4'-diisocyanate was added, and reaction was performed at 80° C. for 3 hours. The reaction system was elevated to 170° C. in 4 hours, and thereafter, the reaction was continued for 1.5 hours at that temperature until completion. During the reaction, the viscosity of the solution increased gradually as carbon dioxide was generated. A polyamideimide polymer wherein one or both ends of at least one molecule thereof was a linear alkyl group having 17 carbon atoms resulted, and its reduced viscosity was 0.47 dl/g. The content of linear alkyl group in the polymer was 3.3 wt%.

COMPARATIVE EXAMPLES 4 THROUGH 6

A copper wire (diameter: 1.0 mm) was coated with six layers of Isomid, a polyester imide wire enamel produced by Nisshoku Snectady Chemical Co., Ltd., and baked. Subsequently, the polyamideimide wire enamels indicated in Table 2 were applied in two layers and baked to prepare polyester imide magnet wires having a polyamideimide overcoat. The characteristics of the magnet wires prepared are set forth in Table 2.

In Table 2 the properties were determined in the same manner as those described in Table 1 except that flexibility (20% snap) in Table 2 was measured according to NEMA MW-1000.

TABLE 2

| | Example 3 | Example 4 | Example 5 | Example 6 | Example 7 | Example 8 | Example 9 |
|---|---|---|---|---|---|---|---|
| | | | Polyamideimide wire enamel used | | | | |
| | Prep. Ex. 3 | Prep. Ex. 2 | Prep. Ex. 1 | Prep. Ex. 4 | Prep. Ex. 5 | Prep. Ex. 6 | Prep. Ex. 7 |
| | | | No. of C atoms in terminal alkyl group | | | | |
| | 27 | 27 | 27 | 27 | 27 | 21 | 21 |

TABLE 2-continued

| Property/Test | Alkyl content of polyamideimide (wt %) | | | | | | |
|---|---|---|---|---|---|---|---|
| | 3.1 | 1.8 | 0.88 | 0.45 | 0.32 | 2.4 | 0.83 |
| Overall diameter (mm) | 1.070 | 1.070 | 1.069 | 1.068 | 0.070 | 1.068 | 1.071 |
| Bare diameter (mm) | 1.000 | 1.000 | 1.000 | 1.000 | 1.000 | 1.000 | 1.000 |
| Thickness of polyester imide undercoat (mm) | 0.028 | 0.028 | 0.028 | 0.028 | 0.028 | 0.027 | 0.0275 |
| Thickness of polyamideimide overcoat (mm) | 0.007 | 0.007 | 0.0065 | 0.006 | 0.007 | 0.007 | 0.007 |
| Appearance | fair | good | good | good | good | good | good |
| Flexibility (20% snap)* | 1d O.K. | 1d O.K. | 2d O.K. | 2d O.K. | 2d O.K. | 2d O.K. | 2d O.K. |
| Heat shock (20% snap, 220° C./30 min) | 2d O.K. | 2d O.K. | 2d O.K. | 2d O.K. | 2d O.K. | 2d O.K. | 2d O.K. |
| Percent methanol extraction (extracted 4 hr) | 0.02 | 0.02 | 0.02 | 0.02 | 0.02 | 0.02 | 0.02 |
| Percent xylol extraction (extracted 4 hr) | 0.08 | 0.07 | 0.08 | 0.07 | 0.07 | 0.08 | 0.07 |
| Percent R-22 extraction (extracted 6 hr) | 0.01 | 0.00 | 0.01 | 0.01 | 0.00 | 0.00 | 0.01 |
| Repeated scrape resistance under 600 g load (No. of repetitions) | 99 | 114 | 101 | 106 | 102 | 104 | 100 |
| Coefficient of static friction | 0.05 | 0.06 | 0.08 | 0.09 | 0.10 | 0.10 | 0.11 |

| | Example 10 | Example 11 | Example 12 | Comp. Ex. 4 | Comp. Ex. 5 | Comp. Ex. 6 |
|---|---|---|---|---|---|---|
| | \multicolumn{6}{Polyamideimide wire enamel used} |
| | Prep. Ex. 8 | Prep. Ex. 1 | Prep. Ex. 8 | Ref. Ex. 1 | Prep. Ex. 9 | Prep. Ex. 10 |
| | No. of C atoms in terminal alkyl group | | | | | |
| | 27–31 | 27 | 27–31 | — | 17 | 17 |
| Property/Test | Alkyl content of polyamideimide (wt %) | | | | | |
| | 0.90–0.91 | 0.88 | 0.90–0.91 | — | 0.95 | 3.3 |
| Overall diameter (mm) | 1.069 | 1.072 | 1.071 | 1.070 | 1.070 | 1.069 |
| Bare diameter (mm) | 1.000 | 1.000 | 1.000 | 1.000 | 1.000 | 1.000 |
| Thickness of polyester imide undercoat (mm) | 0.028 | 0.034 | 0.0335 | 0.028 | 0.028 | 0.0275 |
| Thickness of polyamideimide overcoat (mm) | 0.0065 | 0.002 | 0.002 | 0.007 | 0.007 | 0.007 |
| Appearance | good | good | good | good | good | bad |
| Flexibility (20% snap)* | 2d O.K. | 2d O.K. | 2d O.K. | 2d O.K. | 2d O.K. | 2d O.K. |
| Heat shock (20% snap, 220° C./30 min) | 2d O.K. | 3d O.K. | 3d O.K. | 3d O.K. | 3d O.K. | 2d O.K. |
| Percent methanol extraction (extraction 4 hr) | 0.02 | 0.02 | 0.02 | 0.02 | 0.02 | 0.02 |
| Percent xylol extraction (extracted 4 hr) | 0.08 | 0.08 | 0.08 | 0.08 | 0.08 | 0.09 |
| Percent R-22 extraction (extracted 6 hr) | 0.01 | 0.01 | 0.01 | 0.01 | 0.01 | 0.01 |
| Repeated scrape resistance under 600 g load (No. of repetitions) | 109 | 97 | 99 | 101 | 95 | 92 |
| Coefficient of static friction | 0.07 | 0.08 | 0.08 | 0.23 | 0.17 | 0.16 |

*Measured according to NEMA MW-1000

As is clear from Table 2, the magnet wire of this invention having an undercoat of polyester imide insulation and an overcoat of polyamideimide wire enamel wherein at least one end of the molecules thereof is a linear alkyl group having at least 21 carbon atoms has appreciably better lubricity than the conventional magnet wire, without sacrificing the other properties of the wire. Even a very thin layer of the polyamideimide overcoat exhibits high lubricity.

EXAMPLE 13

A copper wire (diameter: 1 mm) was coated with eight layers of X-600W (a trade name for water-soluble polyimide wire enamel produced by Nitto Electric Industrial Co., Ltd.), and baked to form a coating having a thickness of 0.033 mm. Subsequently, the polyamideimide wire enamel obtained according to Preparation Example 1 was applied in a single layer and baked to prepare a polyester imide magnet wire having an insulating overcoat of a total thickness of 0.035 mm. The coefficient of static friction of the resulting enameled wire measured was 0.07.

EXAMPLE 14

A copper wire (diameter: 1 mm) was coated with seven layers of Type 670 (a trade name for polyesteramidimide wire enamel produced by Dainichiseika Color & Chemicals Mfg. Co., Ltd.), and baked to form an insulating coating having a thickness of 0.033 mm. Subsequently, the polyamideimide wire enamel obtained according to Preparative Example 1 was applied in a single layer and baked to prepare a polyester imide magnet wire having an insulating overcoat of a total thickness of 0.035 mm. The coefficient of static friction of the resulting enameled wire measured was 0.08. The polymer film formed by baking the Type-670 wire enamel at 180° C. for 1 hour and subsequently at 250° C. for 1 hour showed infrared absorption spectrum as shown in FIG. 1.

While the invention has been described in detail and with reference to specific embodiments thereof, it will be apparent to one skilled in the art that various changes and modifications can be made therein without departing from the spirit and scope thereof.

What is claimed is:

1. A magnet wire comprising a conductor having thereon an outermost insulating wire enamel layer, said wire enamel consisting essentially of a polyamideimide wherein either one or both ends of at least one polyamideimide molecule is a terminal linear alkyl group having at least 21 carbon atoms.

2. A magnet wire according to claim 1 wherein said additional insulating layer is one for use in a refrigerant-resistant motor.

3. A magnet wire according to claim 1 wherein said additional insulating layer is a polyester imide.

4. A magnet wire according to claim 1 wherein the terminal linear alkyl groups are linked to the main portion of the polyamideimide molecules through an amide bond.

5. A magnet wire according to claim 1 wherein the terminal linear alkyl groups are linked to the main portion of the polyamideimide molecules through an imide bond.

6. A magnet wire according to claim 1 wherein the terminal linear alkyl groups are linked to the main portion of the polyamideimide molecules through an ester bond.

7. A magnet wire according to claim 1 wherein the terminal linear alkyl groups are linked to the main portion of the polyamideimide molecules through a urethane bond.

8. A magnet wire according to claim 1 wherein the terminal linear alkyl groups are linked to the main portion of the polyamideimide molecules through a urea bond.

9. A magnet wire according to claim 1, 4, 5, 6, 7 or 8 wherein the content of terminal linear alkyl group in the polyamideimide is from 0.3 to 3.2 wt%.

10. A magnet wire according to claim 1, 4, 5, 6, 7 or 8 wherein the content of linear alkyl group in the polyamideimide is from 0.3 to 2.3 wt%.

11. A magnet wire according to claim 1 wherein the polyamideimide is prepared by reacting a polybasic acid that contains a tribasic acid anhydride and a polyisocyanate compound with a linear carboxylic acid having at least 22 carbon atoms.

12. A magnet wire according to claim 11 wherein the tribasic acid anhydride is trimellitic acid anhydride.

13. A magnet wire according to claim 11 wherein the polyisocyanate compound is diphenylmethane-4,4'-diisocyanate.

14. A magnet wire according to claim 11 wherein the linear carboxylic acid is docosanoic acid.

15. A magnet wire according to claim 11 wherein the linear carboxylic acid is octacosanoic acid.

16. A magnetic wire according to claim 1, further comprising an additional insulating layer positioned between said wire and said outermost insulating wire enamel layer.

* * * * *